(No Model.)

W. NICHOLSON.
FRUIT HOLDER.

No. 505,323. Patented Sept. 19, 1893.

WITNESSES:
John A. Rennie
C. Sedgwick

INVENTOR
W. Nicholson
BY
Munn & Co.
ATTORNEYS.

UNITED STATES PATENT OFFICE.

WILLIAM NICHOLSON, OF BROOKLYN, NEW YORK, ASSIGNOR OF ONE-HALF TO ADELBERT A. WEBSTER, OF SAME PLACE.

FRUIT-HOLDER.

SPECIFICATION forming part of Letters Patent No. 505,323, dated September 19, 1893.

Application filed April 12, 1893. Serial No. 470,016. (No model.)

*To all whom it may concern:*

Be it known that I, WILLIAM NICHOLSON, of Brooklyn, in the county of Kings and State of New York, have invented a new and Improved Fruit-Holder, of which the following is a full, clear, and exact description.

The object of the invention is to provide a new and improved fruit holder, which is simple and durable in construction, and more especially designed for holding oranges and like fruit for conveniently eating the same without danger of soiling the fingers or hands.

The invention consists of certain parts and details and combinations of the same, as will be hereinafter described and then pointed out in the claims.

Reference is to be had to the accompanying drawings forming a part of this specification, in which similar letters of reference indicate corresponding parts in both the figures.

Figure 1:
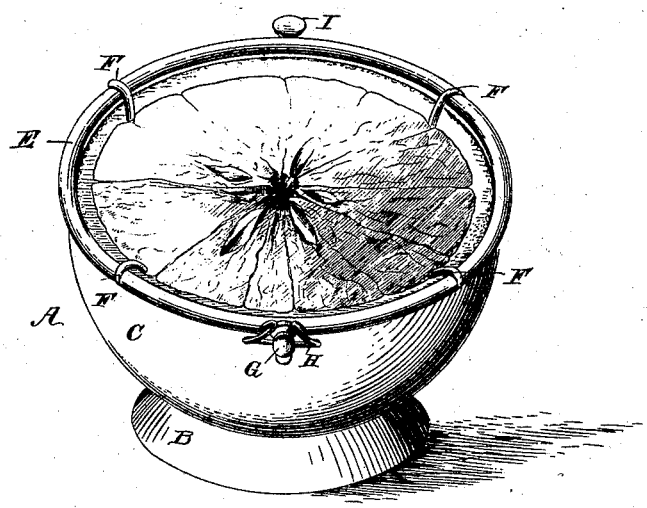
Figure 2:
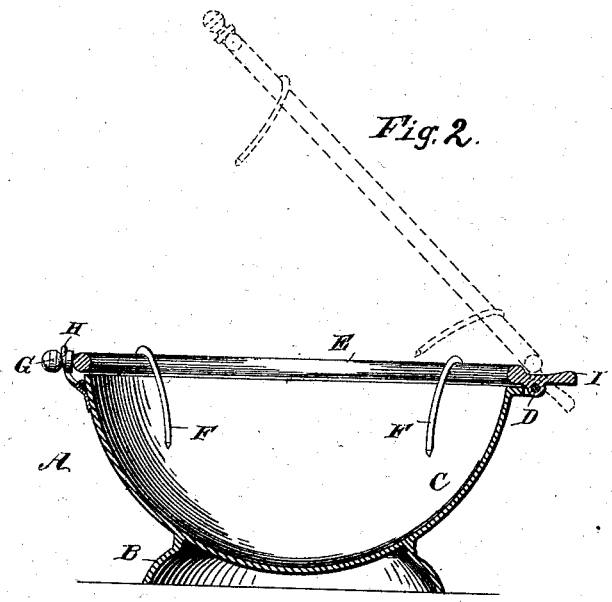

Figure 1 is a perspective view of the improvement; and Fig. 2 is a sectional side elevation of the same.

The improved fruit holder is provided with a fruit receiving vessel A, formed with a base B, and a cup C, of a size to receive half of an orange or like fruit, as indicated in Fig. 1.

On the edge of the cup C is pivoted at D a ring E, formed with inwardly and downwardly projecting prongs F, adapted to engage the fruit between the skin and meat, to securely lock the fruit in place.

On the ring E directly opposite the hinge or pivot D is formed a knob or handle G, for conveniently closing or opening the ring E to engage or disengage the prongs F from the fruit. The knob G is adapted to be engaged by spring catches H, held on the cup C to lock the said knob and consequently the ring E, in position on the edge of the cup C when in closed position, as illustrated in the drawings.

In using this fruit holder, the ring E is swung into an open position as indicated in dotted lines in Fig. 2, to permit of placing the half orange in the cup C, after which the ring E is swung down so that the prongs F engage the fruit to lock or clamp the latter in place in the cup. The ring E in closing is engaged by and locked in place by the spring catches H. The meat of the fruit can now be conveniently removed with a spoon or other suitable tool, without danger of accidentally dislodging the fruit held in the cup or soiling the eater's hands. On the pivot end of the ring E is arranged a small finger piece I, which when pressed assists in opening the ring E.

I do not limit myself to the special clamping device for holding the fruit in place in the cup, or the special construction of the spring catches for locking the ring in place, as other suitable equivalent devices may be substituted for the same without departing from the spirit of my invention.

Having thus fully described my invention, I claim as new and desire to secure by Letters Patent—

1. A fruit holder, comprising a cup having a base, and a ring hinged on the said cup and provided with inwardly and downwardly projecting prongs adapted to engage the fruit to hold the same in place in the cup, substantially as shown and described.

2. A fruit holder, comprising a cup having a base, a ring hinged on the said cup and provided with inwardly and downwardly projecting prongs adapted to engage the fruit to hold the same in place in the cup, and a locking device for locking the said ring to the said cup, substantially as shown and described.

3. A fruit holder, comprising a cup having a base, a ring hinged on the said cup and provided with inwardly and downwardly projecting prongs adapted to engage the fruit to hold the same in place in the cup, and a finger piece on the pivot end of the said ring to assist in opening the latter, substantially as shown and described.

WILLIAM NICHOLSON.

Witnesses:
J. FRED ACKER,
C. SEDGWICK.